United States Patent [19]

Truskalo

[11] Patent Number: 4,636,911

[45] Date of Patent: Jan. 13, 1987

[54] RESONANT DEGAUSSING FOR A VIDEO DISPLAY SYSTEM

[75] Inventor: Walter Truskalo, Titusville, N.J.

[73] Assignee: RCA Corporation, Princeton, N.J.

[21] Appl. No.: 676,813

[22] Filed: Nov. 30, 1984

[51] Int. Cl.[4] .............................................. H04N 9/29
[52] U.S. Cl. .................................................. 361/150
[58] Field of Search ............................. 361/150; 315/8

[56] References Cited

U.S. PATENT DOCUMENTS

| 3,733,524 | 5/1973 | Cooksey et al. | 361/150 |
| 4,445,072 | 4/1984 | Fredres | 315/8 |
| 4,535,270 | 8/1985 | Frantz et al. | 315/8 |

Primary Examiner—Michael L. Gellner
Attorney, Agent, or Firm—Paul J. Rasmussen; Joseph Laks; Scott J. Stevens

[57] ABSTRACT

A resonant degaussing circuit for a video display apparatus permits frequent degaussing during operation of the display apparatus. In order to provide effective degaussing for large screen cathode ray tubes, an inductor is connected in parallel with the degaussing coil. The inductor increases the degaussing resonant frequency so that a greater number of resonant cycles occur before the degaussing current decreases below a predetermined level.

7 Claims, 5 Drawing Figures

RESONANT DEGAUSSING FOR A VIDEO DISPLAY SYSTEM

This invention relates to degaussing systems for video display apparatus and, in particular, to resonant degaussing systems having rapid recovery.

Color video display apparatus require periodic degaussing or demagnetization to counteract the effects of the earth's magnetic field and the effects of electromagnetic fields produced by nearly electrical devices, such as motors or appliances. These fields may magnetize metallic portions of the cathode ray tube, such as the shadow mask, and other metallic parts of the video display apparatus causing a degradation of the color purity of the tube. For that reason, video display apparatus, such as television receivers and computer or video display monitors, usually incorporate a degaussing circuit which becomes operative when the apparatus is first energized to produce an alternating current field that decays toward zero in order to demagnetize the metallic components in the vicinity of the tube and of the tube itself.

A common type of degaussing circuit is powered from the AC line supply, which in the United States has a frequency of 60 Hz. This type of degaussing circuit ordinarily utilizes a positive temperature coefficient resistor, or thermistor, or other temperature sensitive component, which increases in resistance as its temperature increases due to degaussing current flow. This causes the alternating degaussing current to decay in a manner that provides demagnetization of the video display apparatus metallic components. A small residual current will continue to flow in the thermistor to keep it heated as long as the display apparatus is energized.

Although this type of degaussing circuit is quite effective for television receivers, it has some disadvantages when used with computer monitors or video display terminals that are subject to frequent movement or reorientation for different viewers. Such movement also reorients the cathode ray tube with respect to the earth's magnetic field, which may require degaussing of the tube. Frequent movement of the video display apparatus may therefore require frequent degaussing to be performed. A degaussing circuit incorporating a thermistor requires a relatively long recovery period after power is removed to allow the thermistor to cool sufficiently. This recovery period may be of the order of twenty minutes, which is undesirable when frequent movement of the display apparatus is contemplated. Additionally, computer monitors or video display terminals require input and output capability for direct video and RGB signals. This requires electrical isolation between the input and output terminals and the AC line, which is often accomplished by isolating most of the components of the video display apparatus, including the cathode ray tube, from the AC line rather than just the input and output terminals. The degaussing coil is powered from the AC line and consequently is not isolated from it, therefore it must be carefully insulated from the tube and surrounding circuits. This increases the cost and complexity of the video display apparatus.

A resonant or ring-down degaussing circuit overcomes some of the previously described disadvantages of the thermistor degaussing circuit. The resonant degaussing circuit operates by causing a capacitor connected in parallel with the degaussing coil to resonate with the coil in an oscillating manner. The finite Q of the resonant circuit causes the degaussing current to decay in the desired manner to effect demagnetization of the display apparatus metallic parts. Recovery of the degaussing circuit is very fast and requires only the time needed to recharge the capacitor, so that degaussing may be accomplished as often as needed without turning off the display apparatus. Additionally, the degaussing coil and resonant capacitor may be electrically isolated from the AC line, thereby simplifying insulation requirements.

In order to produce effective degaussing, at least a predetermined minimum number of degaussing current resonant cycles must occur before the degaussing current decays significantly. Although the degaussing resonant frequency is very fast, of the order of 2 KHz, the degaussing current may decay below an effective level before a sufficient number of degaussing current resonant cycles have been completed, thereby causing residual magnetism of the metallic parts of the video display apparatus to remain.

In accordance with the present invention, a degaussing circuit for a video display apparatus comprises a source of voltage and a capacitor charged from the voltage source. A degaussing coil is coupled to the capacitor and forms a first resonant circuit having a first resonant frequency. An inductor is coupled in parallel with the degaussing coil to form a second resonant circuit having a second resonant frequency.

In the accompanying drawing.

Figure 1:
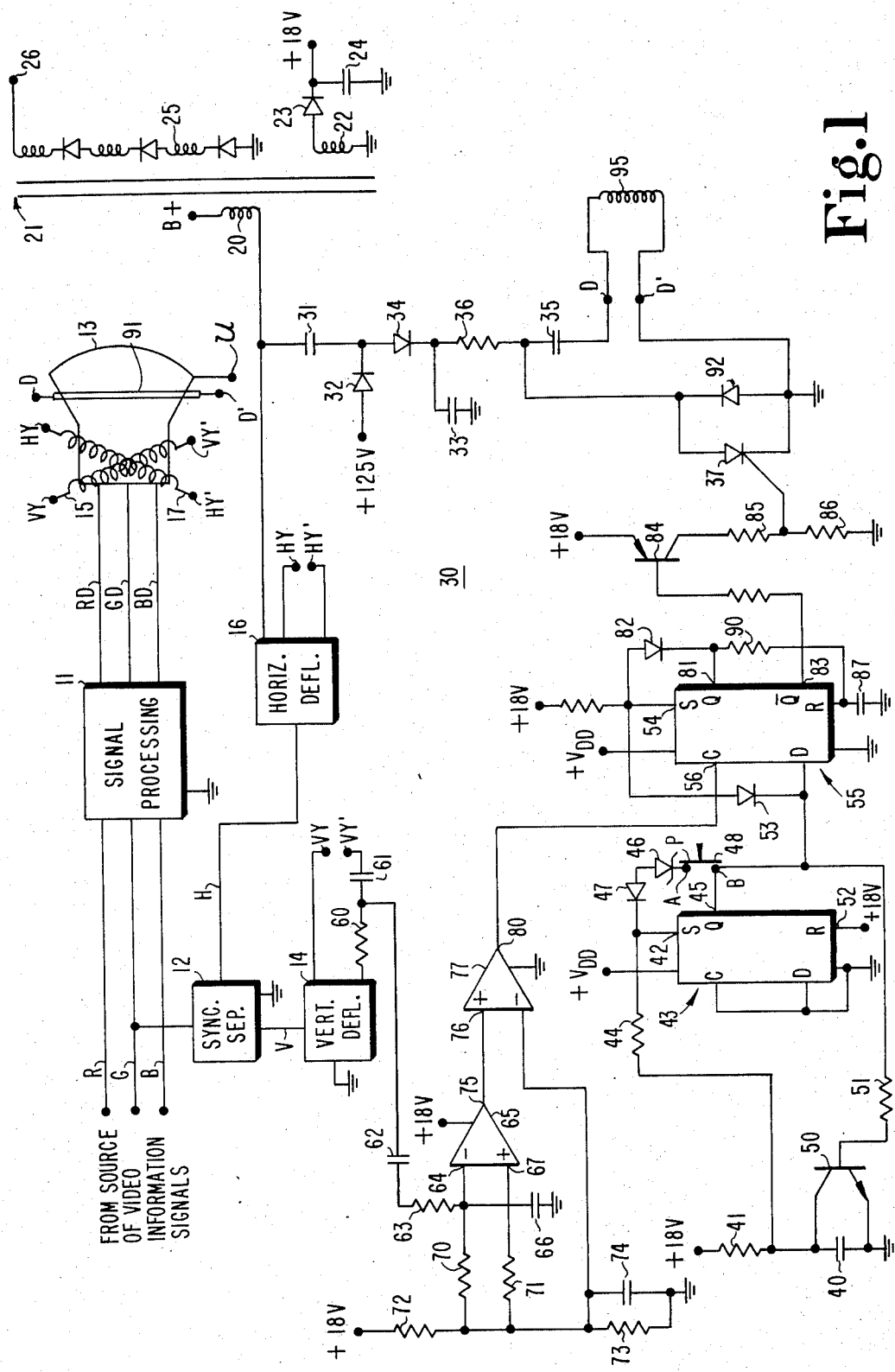
FIG. 1 is a schematic and block diagram of a portion of a video display apparatus, incorporating a degaussing circuit constructed in accordance with an aspect of the present invention.

Referring to FIG. 1, there is shown a schematic and block diagram of a portion of a video display apparatus which receives video information signals from, for example, a computer. The video information signals may be of the form, for example, of a composite video signal incorporating chrominance, luminance, and synchronizing information. The video information signal may also be provided in the form of a modulated or a base band video signal, or in the form of separate red, green and blue color signals (RGB signals) with the synchronizing information incorporated in one of the color signals or as a separate input. The form of the video information signal will, of course, depend on the design of the video information signal source. For illustrative purposes, the circuit of FIG. 1 is shown in a form that is responsive to separate RGB signals having demodulated, or base band, video information.

The video information signal is provided as RGB signals from a source of video information (not shown) to signal processing circuits 11. The green video signal which incorporates the synchronizing information, is also applied to a synchronizing pulse separator circuit 12. The signal processing circuits provide red, green and blue drive signals (RD, GD, BD) to the electron gun assembly, not shown, of a cathode ray tube 13.

The synchronizing pulse separator circuit 12 provides vertical rate synchronizing pulses on a conductor V to a vertical or field rate deflection circuit 14 which provides a deflection current, via terminals VY and VY', in a vertical deflection winding 15 disposed on the kinescope 13. Synchronizing pulse separator circuit 12 also provides horizontal or line rate synchronizing pulses on a conductor H which are applied to a horizontal deflection circuit 16 which generates a deflection current via terminals HY and HY', in a deflection winding 17, also disposed on cathode ray tube 13.

The horizontal deflection circuit 16 also generates horizontal retrace pulses which are applied to one terminal of a winding 20 of a power supply transformer 21. The other terminal of winding 20 is coupled to a source of B+ voltage (not shown). Power supply transformer 21 is shown as illustratively comprising a winding 22 which, via rectifying diode 23 and a filter capacitor 24 provides a source of voltage of the order of +18 volts, which may be used to power circuits of the video display apparatus. Transformer 21 may comprise other windings (not shown) which provide other voltage supplies for circuits that operate at other voltage levels. Power transformer 21 also comprises high voltage winding 25 which generates a high voltage or ultor potential at a terminal 26 that is applied to the ultor terminal U of cathode ray tube 13.

In accordance with an aspect of the present invention, there is provided a degaussing circuit 30 of the resonant or ring-down type. When the video display apparatus is energzied, horizontal retrace pulses having an amplitude of the order of 800 volts begin to charge capacitor 31. Diode 32 clamps capacitor 31 to the +125 volt supply in order to increase the voltage across capacitor 31 to approximately 925 volts. The voltage across capacitor 31 then charges capacitor 33 to approximately 925 volts through rectifying diode 34 during the course of 5–10 horizontal deflection cycles.

The voltage developed across capacitor 33 causes resonant degaussing capacitor 35 to also become charged to 925 volts through current limiting resistor 36. Resistor 36 limits the current flow to prevent the generation of any electromagnetic fields that could magnetize metallic components of the video display apparatus. Capacitor 35 becomes fully charged in approximately 2 seconds. With capacitor 35 charged, degaussing circuit 30 is enabled and becomes energized when SCR 37 is triggered.

The trigger pulses for SCR 37 are generated in the following manner. When energization of the video display apparatus is initiated, by, for example, turning on the B+ power supply source, horizontal deflection circuit begins to operate to generate the +18 V supply voltage. The presence of the +18 V supply acts as a signal that represents the initiation of the energization of the video display apparatus and thus represents a signal that is used to initiate a degaussing operation.

The +18 volt supply will cause capacitor 40 to charge to approximately 9 volts through resistor 41. This voltage, applied to the SET input 42 of flip-flop 43 through resistor 44, causes the Q output 45 of flip-flop 43 to change to a logic 1 state, having a level of approximately +18 volts. This voltage, applied to the base of transistor 50 through resistor 51, causes transistor 50 to conduct, thereby discharging capacitor 40. Zener diode 46 and diode 47 cause a voltage to be applied to input 42 of flip-flop 43 through a normally closed switch 48 to maintain flip-flop 43 in its logic 1 state. The voltage applied to the SET input 42 will be approximately 6 volts below the Q output 45 level of +18 volts, due to the voltage drop provided by zener diode 46 and diode 47. The RESET input 52 will be at the same voltage as output 45. The lower voltage at input 42 provides hysteresis to allow flip-flop 43 to reset quickly if power is removed temporarily, in order to allow degaussing to occur when power is reapplied. The hysteresis effect operates as follows. Both the SET input 42 and the RESET input 52 require approximately 9 volts to maintain a logic 1 state. Since input 42 is held at about 6 volts below that of input 52 by action of zener diode 46 and diode 47, removal of power from flip-flop 43 will cause the SET input 42 to lose its logic 1 state while the RESET input 52 is still in a logic 1. This causes flip-flop 43 to reset.

A logic 1 at output 45 will cause diode 53 to become reverse biased which applies a voltage to the SET input 54 of flip-flop 55 sufficient to allow the Q output 81 of flip-flop 55 to go to a logic 1 state. Q output 81 does not change to a logic 1 state, however, until a positive going pulse is received at CLOCK input 56.

Figure 2:
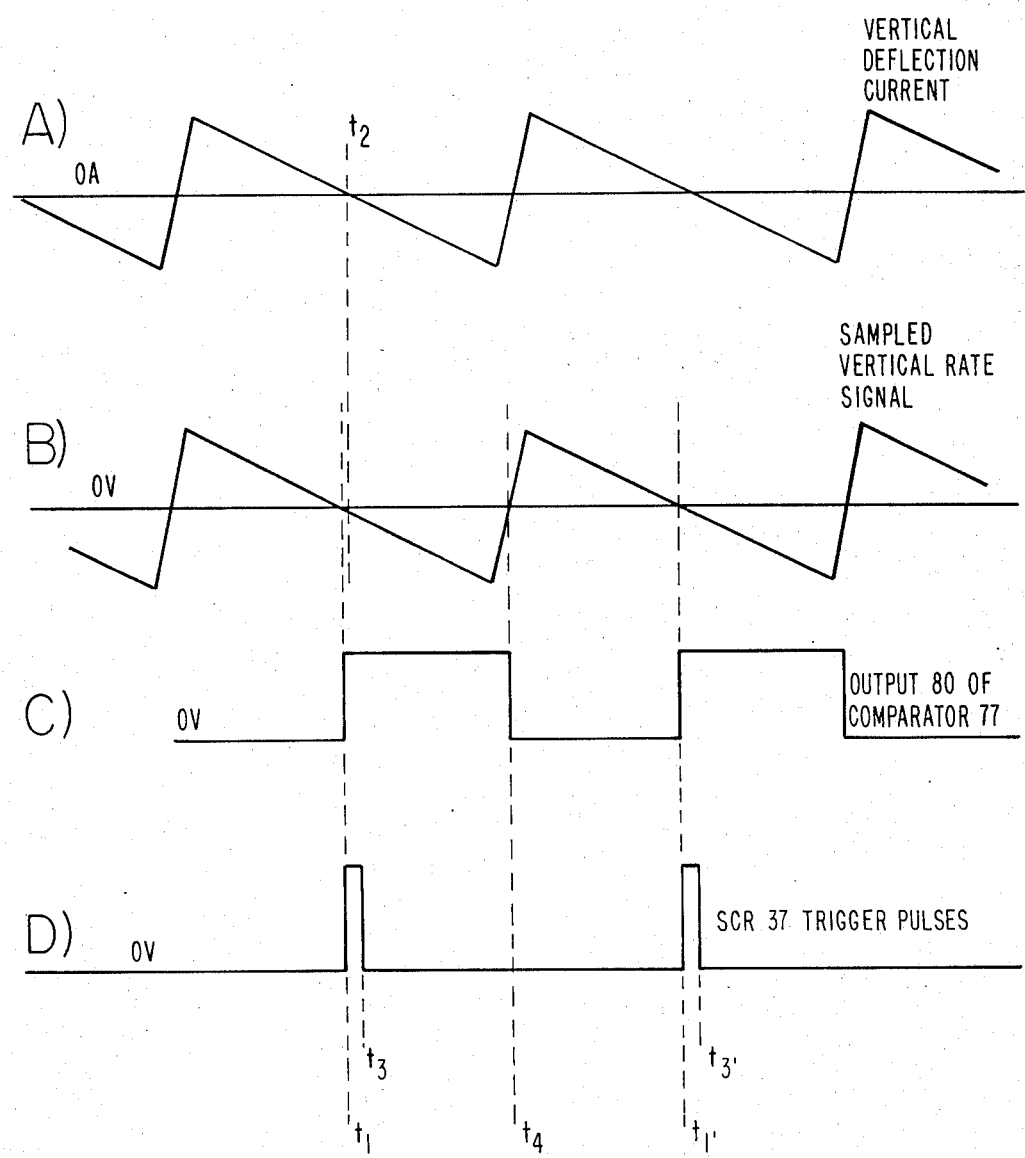
FIGS. 2 and 3 illustrate waveforms associated with the circuit of FIG. 1.

The positive going pulse at CLOCK input 56 is generated as follows. A vertical rate sawtooth signal representative of vertical yoke current is sampled by sampling resistor 60 and capacitor 61 from the return conductor of the vertical deflection winding 15. Vertical deflection current is shown in FIG. 2A. The sampled signal, having a waveform as shown in FIG. 2B, is applied via a capacitor 62 and a resistor 63 to the inverting input 64 of an operational amplifier or comparator 65. The sampled signal is AC coupled so that it varies positively and negatively about zero. The time constant of the circuit which applies the sampled signal to comparator 65 causes the signal to pass through zero at a time $t_1$ which is slightly before the center (time $t_2$) of the vertical trace interval, as shown in FIGS. 2A and 2B. This permits degaussing to begin just before the middle of vertical trace so that it ends before any appreciable vertical deflection current has been produced. The operation of the degaussing circuit when the vertical deflection current is substantially zero therefore prevents stray flux from the vertical deflection winding from causing residual magnetism of the video display apparatus metallic parts.

Capacitor 66, also coupled to inverting input of comparator 65, filters any horizontal rate signals from the vertical rate sampled signal via the horizontal deflection winding. Both the inverting input 64 and the noninverting input 67 are biased to one half the supply voltage, i.e., 9 volts, by resistors 70 and 71, respectively, and by a voltage divider established by resistors 72 and 73. Capacitor 74 provides a bypass path for the voltage divider. The sampled vertical rate signal is referenced to this bias voltage and swings above and below it. The gain of comparator 65 is very high, so that the output 75 will essentially switch from zero to +18 volts as the voltage on the inverting input 64 falls below that on the noninverting input 67. This occurs as the sampled signal passes from positive to negative near the center of vertical trace, which corresponds to the vertical current zero crossing. The output 75 of comparator 65 is connected to the noninverting input 76 of a comparator 77. As the output 75 of comparator 65 goes high, the output 80 of comparator 77 will also go high, as shown in FIG. 2C. Comparator 77 is provided to shorten the rise time of the positive going pulse from comparator 65.

The positive going pulse from comparator 77 is applied to the CLOCK input 56 of flip-flop 55 and causes the Q output 81 of flip-flop 55 to change to a logic 1 state. This reverse biases diode 82 which applies a voltage to SET input 54 sufficient to maintain Q output 81 in a logic 1 state until power is removed. This prevents a degaussing operation from taking place each vertical deflection interval. The NOT Q output 83 of flip-flop 55 will switch to a logic 0 state which forward biases transistor 84, causing it to saturate so that current flows through resistors 85 and 86. The voltage drop across resistor 86 will trigger SCR 37, initiating the degaussing operation. The logic 1 state of approximately +18 volts on Q output 81 of flip-flop 55 causes capacitor 87 to charge via resistor 90. After approximately 12 milliseconds, flip-flop 55 is reset, which causes both Q output 81 and NOT Q output 83 to maintain a logic 1 state. When NOT Q output 83 switches to a logic 1 state, transistor 84 becomes reverse biased, and SCR 37 turns off. The SCR 37 trigger pulses are shown in FIG. 2D.

Figure 3:
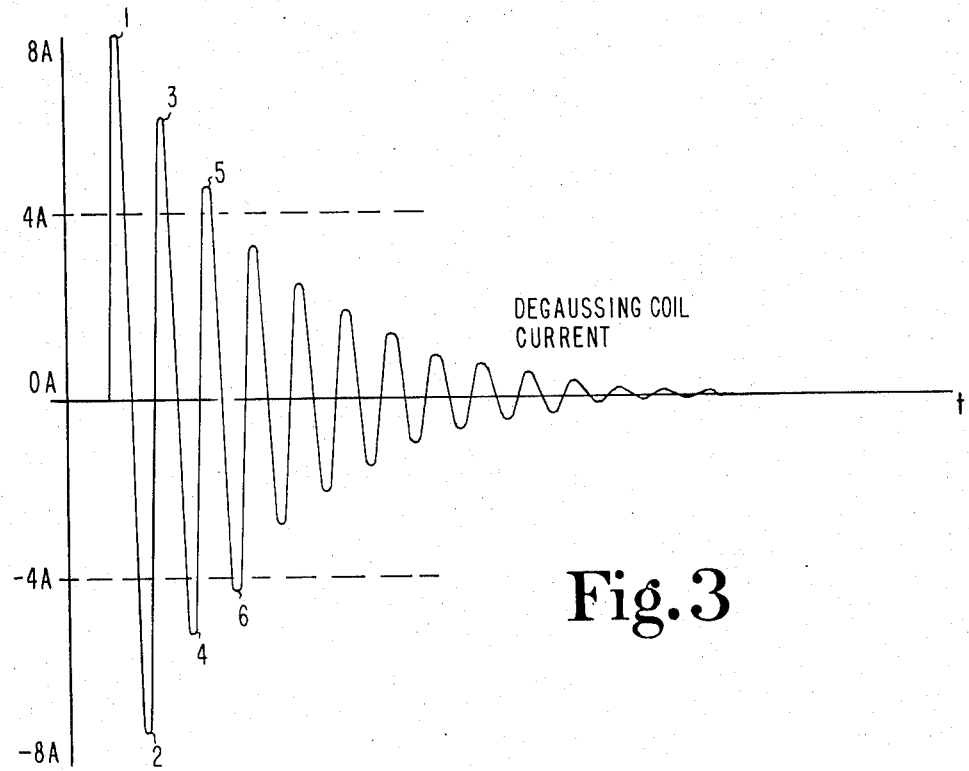

When SCR 37 is triggered into conduction, capacitor 35 begins a resonant discharge thru inductor 95 and through degaussing coil 91 located on cathode ray tube 13 via terminals D and D'. The degaussing current in degaussing coil 91 is illustrated in FIG. 3.

Losses exist in the circuit components, including magnetic hysteresis and eddy current losses in the magnetizable components of the display apparatus that is to be degaussed. These losses will cause the degaussing current to decrease each cycle, so that the degaussing current of FIG. 3 rings down to zero in an alternating current manner, with decreasing peak amplitudes 1, 2, 3, etc..

The degaussing operation occurs in approximately 5 milliseconds, while the vertical deflection current is still substantially zero. The SCR is triggered for approximately 12 milliseconds which is sufficiently long that degaussing is completed while the SCR is conducting. This prevents any residual degaussing current from remagnetizing the cathode ray tube after the SCR 37 is turned off.

It has been found that effective degaussing requires at least 6 peak excursions of the degaussing current to occur before the degaussing current falls below one half of the maximum amplitude it achieved in the first cycle of oscillation. This requirement may be difficult to satisfy for video display systems having large screen (i.e., 19 V and larger) cathode ray tubes, as large screen tubes cause the degaussing current to decay rapidly compared to small screen tubes.

In accordance with an aspect of the present invention, an inductor 95 is connected in parallel with degaussing coil 91 to form a part of the resonant degaussing circuit. Inductor 95 increases the resonant frequency of the degaussing circuit, so that a greater number of degaussing cycles will occur in a given time.

Inductor 95 is constructed so that very little of the energy stored in capacitor 35 is dissipated in the inductor as compared to the energy dissipated in degaussing coil 91 and in the components of the display apparatus being degaussed. The resistance in series with inductance 95 is substantially smaller than the equivalent resistance in series with degaussing coil 91. By adding such an inductor, the effective Q of the resultant resonant circuit is greatly increased over the effective Q of a resonant circuit formed only by capacitor 35 and degaussing coil 91. This greatly increased effective Q allows for a shallower decay of the degaussing current and thus allows for more cycles of oscillation to occur before the half-amplitude value is reached. As can be seen in FIG. 3, which illustrates the degaussing current for a video display system having a 19 V cathode ray tube and incorporating a degaussing circuit in accordance with the present invention, at least 6 peak current excursions occur before the degaussing current falls to one-half of its original maximum amplitude level.

In the circuit of FIG. 1, degaussing coil 91 illustratively has an inductance of the order of 4.1 mH. Capacitor 35 has a capacitance of the order of 1.4 μF. Inductor 95 illustratively has an inductance of the order of 10 mH. Flip-flops 43 and 55 may illustratively be of a type designated CD4013, manufactured by National Semiconductor Corporation.

Figure 4:
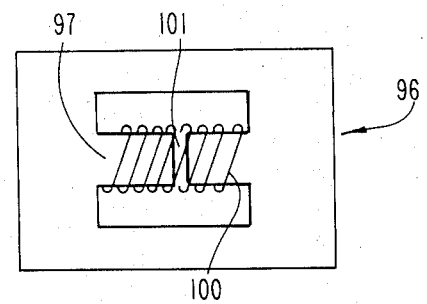
FIG. 4 illustrates a side elevational view of an embodiment of a component shown in FIG. 1.

Inductor 95 may be formed as illustratively shown in FIG. 4. A core 96 having a large flux density incorporates a center leg 97. A coil 100, comprising of the order of 165 turns of #22 wire, is wound about core leg 97. A gap 101, of the order of 32 mils, may be formed in core leg 97. Other forms of inductor 95 are of course possible.

Figure 5:
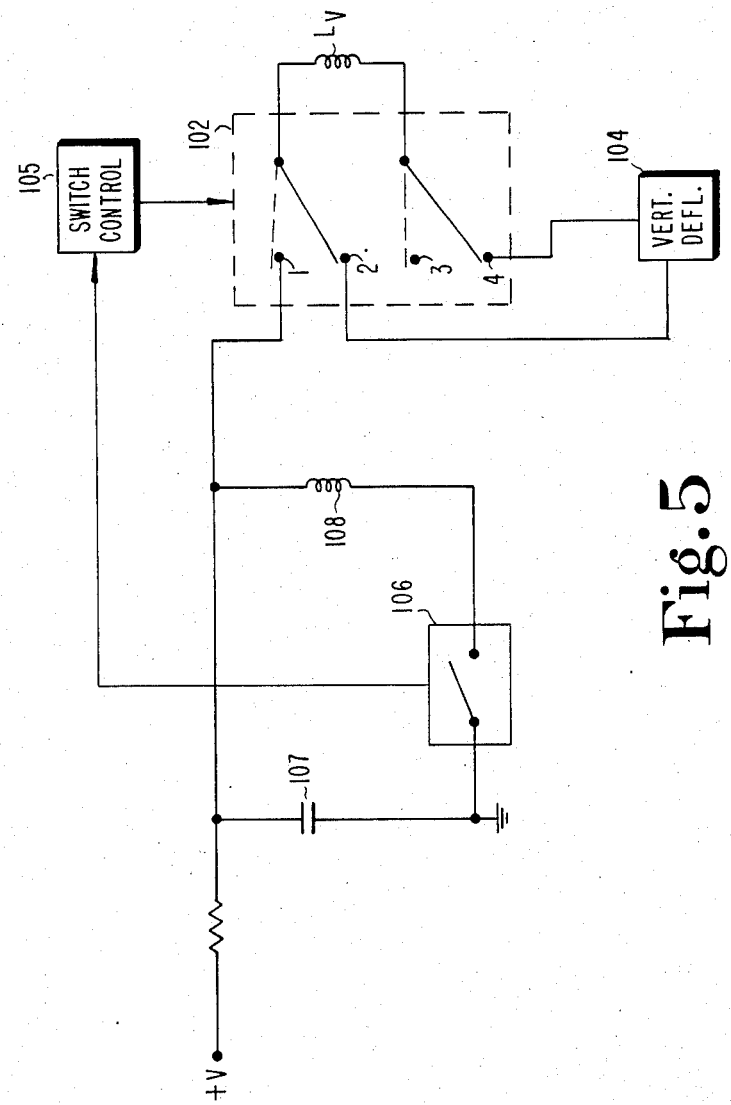
FIG. 5 illustrates a schematic and block diagram of an alternate embodiment of a portion of the circuit shown in FIG. 1.

FIG. 5 illustrates an alternate embodiment of a degaussing circuit in which the vertical deflection winding $L_V$ is coupled to the degaussing circuit during the degaussing cycle. A double pole, double throw switch 102 having contact terminals 1 through 4 disconnects the vertical deflection winding $L_V$ from the vertical deflection circuit 104 in response to a signal obtained from which control circuit 105. Switch control circuit 105 is in turn responsive to degaussing switch 106. Closure of degaussing switch 106 allows capacitor 107 to resonate with degaussing coil 108 and vertical deflection winding $L_V$.

In accordance with a different aspect of the invention, a manual switch 48 is provided to permit manual degaussing while the video display apparatus is operating. Frequent movement of the video display apparatus will not pose any problems as degaussing may be performed repeatedly without any waiting period.

Manual degaussing switch 48 is normally in the closed position with pole P making a short-circuit connection between contact terminals A and B. To initiate degaussing, degaussing switch 48 is momentarily opened, breaking the connection between the Q output and the SET terminals of flip-flop 43. The SET terminal goes low, enabling the high signal at the RESET terminal to make the Q output go low. The low-state Q output signal of flip-flop 43 is coupled to the SET input of flip-flop 55 to initiate degaussing operation in the manner previously described.

The low Q output of flip-flop 43 turns off transistor 50, enabling capacitor 40 to recharge through resistor 41. The recharging is a function of the RC time constant associated with capacitor 40 and may illustratively take 3 seconds from full discharge to reach a voltage level that enables the SET input terminal of flip-flop 43 to go high. By that time, manual degaussing switch 48 has been returned to its normally closed position. When SET terminal of flip-flop 43 goes high, the Q output goes high and is latched high by feedback to the SET terminal via the now closed switch 48, returning the degaussing circuit to the original state it was in before manual degaussing was initiated.

Manual degaussing switch may, for example, comprise a momentary-off, mechanical switch, that automatically and quickly resets to its closed position prior to the time capacitor 40 recharges to the voltage that produces a high state at SET terminal of flip-flop 43.

The degaussing circuit of the present invention, therefore, provides effective degaussing for video display apparatus having large screen cathode ray tubes in an environment in which frequent degaussing may be required.

What is claimed is:

1. A degaussing circuit for a video display apparatus comprising:
   a source of voltage;
   energy storage means coupled to said source of voltage;
   a degaussing coil coupled to said energy storage means to form a first resonant circuit current loop having a first resonant frequency;
   inductance means coupled to said degaussing coil to form a second resonant circuit current loop having a second resonant frequency; and
   means for discharging said energy storage means through said degaussing coil and said inductance means to provide degaussing of said video display apparatus.

2. The arrangement defined in claim 1, wherein said energy storage means comprises a capacitor.

3. The arrangement defined in claim 1, wherein said energy storage means discharges through said degaussing coil in an alternating current at a frequency of oscillation greater than said first resonant frequency.

4. The arrangement defined in claim 1, wherein said inductance means is coupled in parallel with said degaussing coil.

5. The arrangement defined in claim 1, wherein the equivalent resistance in series with said degaussing coil is significantly greater than the resistance of said inductance means.

6. The arrangement defined in claim 1, wherein the inductance of said inductance means is greater compared to the inductance of said degaussing coil.

7. A degaussing circuit for a video display apparatus comprising:
   a source of potential;
   energy storage means coupled to and charged from said source of potential to a first voltage level;
   a degaussing coil coupled to said energy storage means for resonating with said energy storage means such that said energy storage means becomes discharged to a second voltage level within a number of resonant cycles;
   inductance means coupled to said degaussing coil for increasing the number of said resonant cycles that occur before said energy storage means becomes discharged to said second voltage level.

* * * * *